United States Patent
Owens

(10) Patent No.: US 6,193,195 B1
(45) Date of Patent: Feb. 27, 2001

(54) CLAMP FOR METAL TUBING

(76) Inventor: Carl H. Owens, 5215 Phillips Hwy., Suite 1., Jacksonville, FL (US) 32207

( * ) Notice: Subject to any disclaimer, the term of this patent is extended or adjusted under 35 U.S.C. 154(b) by 0 days.

(21) Appl. No.: 09/299,479

(22) Filed: Apr. 26, 1999

(51) Int. Cl.[7] .................................................. F16L 3/22
(52) U.S. Cl. ........................................ 248/68.1; 248/74.4
(58) Field of Search .................. 248/68.1, 74.4, 248/49

(56) References Cited

U.S. PATENT DOCUMENTS

| | | | |
|---|---|---|---|
| 1,834,404 | * 12/1931 | Koch | 248/68.1 |
| 2,338,660 | * 1/1944 | Morehouse | 248/68.1 |
| 2,354,919 | * 8/1944 | Lockwood | 248/68.1 |
| 2,355,742 | * 8/1944 | Morehouse | 248/68.1 |
| 2,361,943 | * 11/1944 | Issoglio et al. | 248/68.1 |
| 3,592,427 | * 7/1971 | Misuraca | 248/68.1 |
| 4,037,810 | * 7/1977 | Pate | 248/68.1 |
| 4,744,535 | * 5/1988 | Patenaude | 248/74.1 |
| 4,919,372 | * 4/1990 | Twist et al. | 248/56 |
| 5,060,810 | * 10/1991 | Jones | 211/59.4 |
| 5,160,105 | * 11/1992 | Miller | 248/188.9 |
| 5,794,897 | * 8/1998 | Jobin et al. | 248/74.4 |
| 5,819,807 | * 10/1998 | Reed | 138/121 |
| 6,126,119 | * 10/2000 | Giangrasso | 248/58 |

* cited by examiner

Primary Examiner—Anita M. King
(74) Attorney, Agent, or Firm—Thomas C. Saitta

(57) ABSTRACT

An improved clamping device for securing a thin-walled tube against movement in the axial direction during cold forming operations performed on the tube end, the clamping device having a base member and a clamping member each containing semi-circular channels which combine to define a generally circular bore to receive a tube, where the channel walls are provided with plural annular grooves, each groove having a recess bounded by two raised shoulders which extend into the interior from the channel wall and are pressed into the outer wall of the tube to provide a frictional grip against axial movement of the tube.

14 Claims, 3 Drawing Sheets

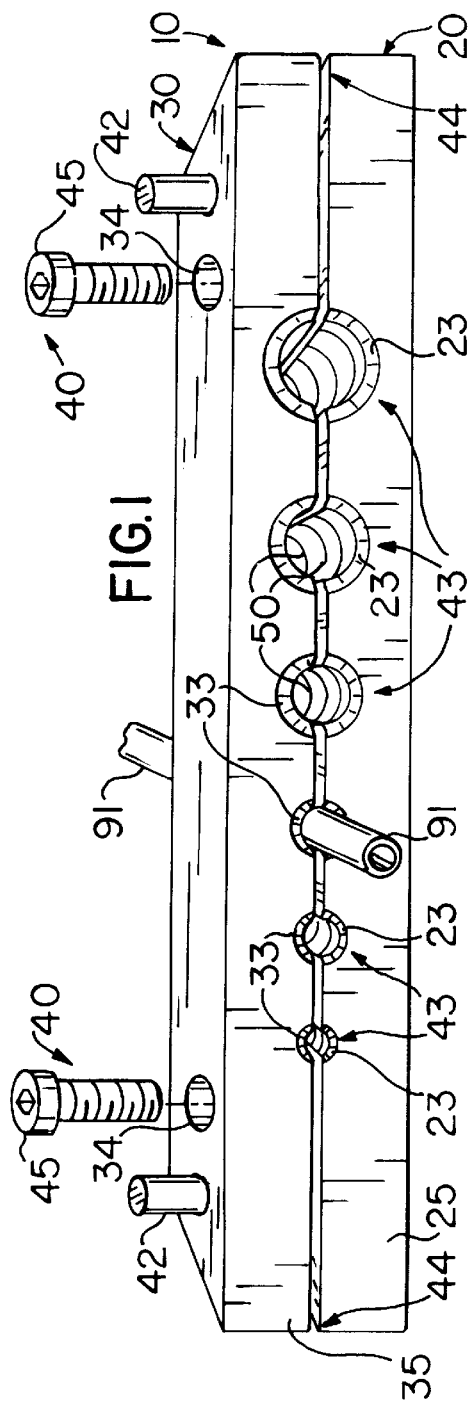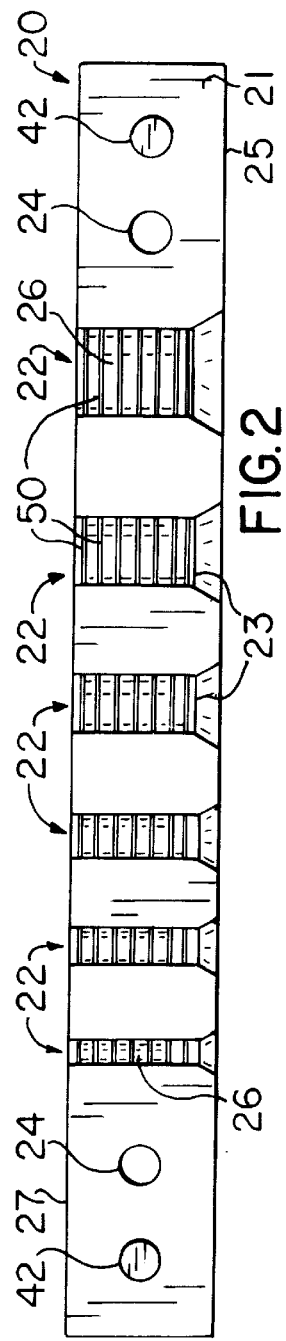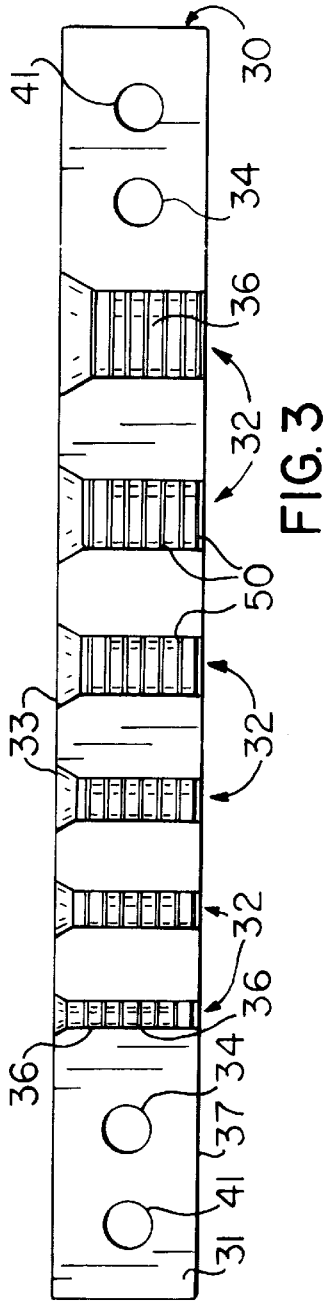

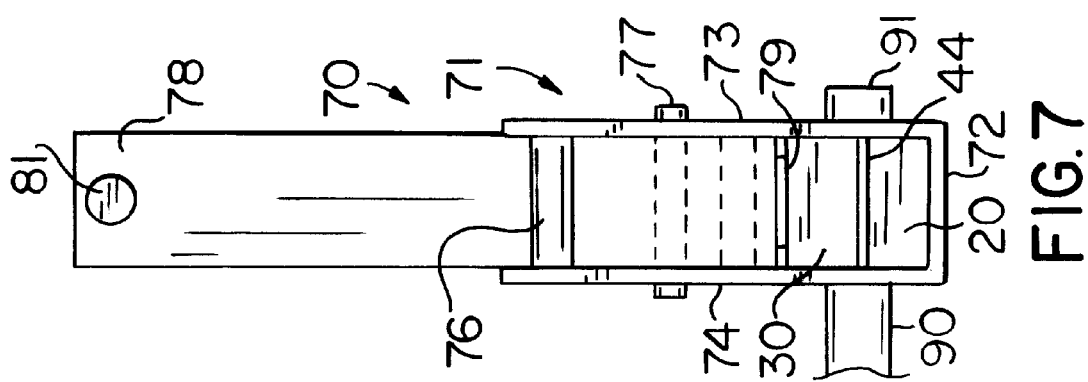
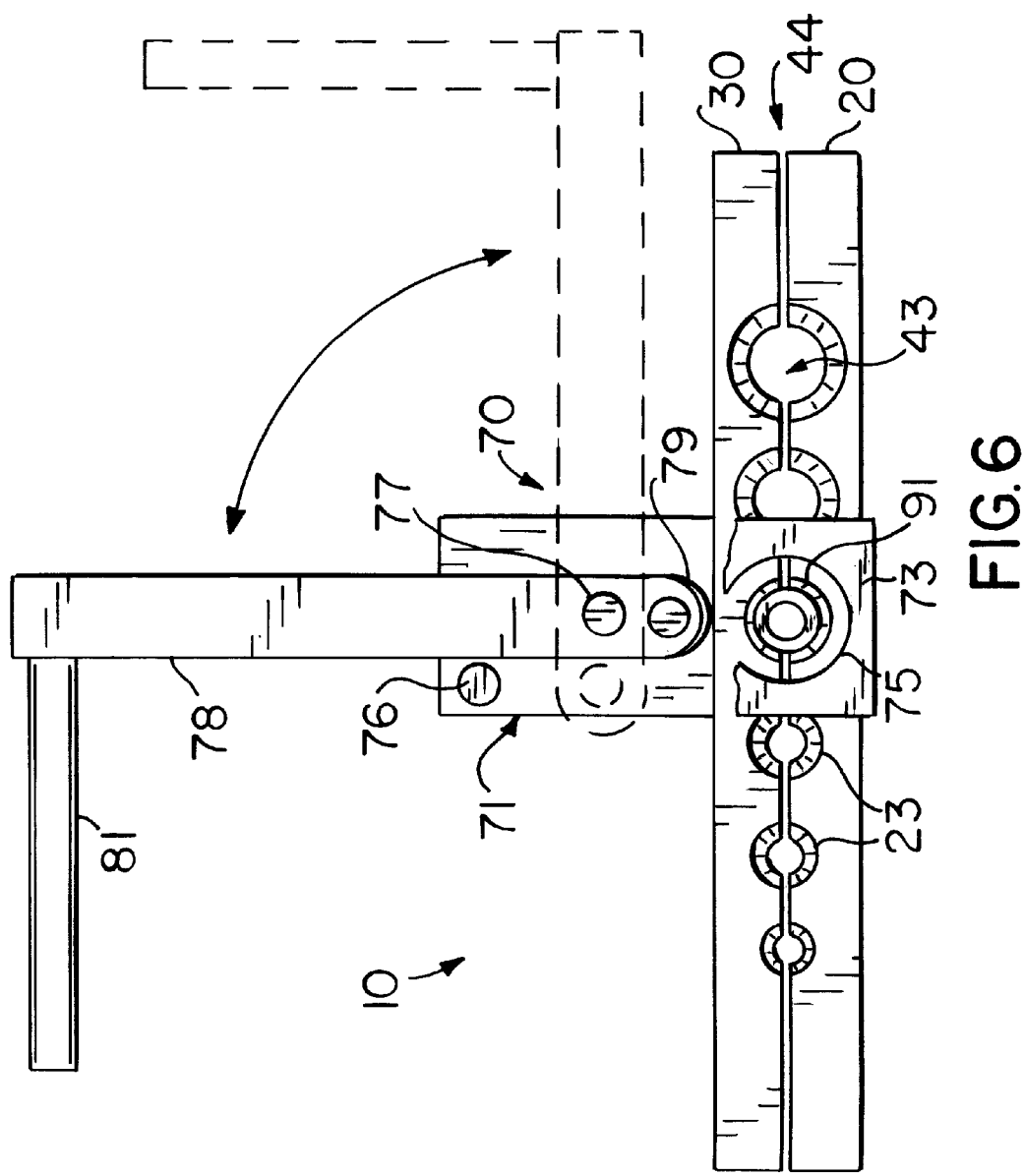

CLAMP FOR METAL TUBING

BACKGROUND OF THE INVENTION

This invention relates generally to the field of devices used to secure metal tubing, and in particular thin-walled metal tubing, during end forming operations such as flaring, beading, upsizing and downsizing. More particularly, the invention relates to such devices which involve a clamping bar having one or more tube receiving bores, where the bar is divided into two members on a plane passing through the bore axis or axes, so that the bar halves may be separated for insertion of a metal tube into the bore. The two bar halves are then pressed together to tightly clamp the metal tube to prevent movement of the tube relative to the clamp in the axial direction.

There are numerous cold-forming operations which must be performed on relatively thin-walled metal tubes in order to provide a tube having a properly configured end segment for a particular application. Thin-walled tubes of aluminum, steel, or equivalent metals or alloys are well known and are used in thousands of different applications where a specific end configuration is required, such as to join the tubes to fittings or other components in an equipment fluid line. The tubes are created by taking a stock tube having a constant outer and inner diameter and altering the end of the tube by pressing a die onto the tube end in the axial direction, the die deforming the metal into the desired configuration. For example, the tube end may need to be flared into a conical or bell-shaped configuration, or an annular bead may need to be created about its circumference, or the tube end may need to be downsized or upsized. Because the force is applied in the axial direction, typically by a hydraulic press, and must be sufficient to deform the metal of the tube wall into the desired shape, the tube must be securely clamped to prevent movement of the tube in the axial direction. At the same time, because the tube is thin-walled, the clamping device must prevent any bending, folding or crimping during the cold forming operation.

A known clamping device for securing thin-walled metal tubes to prevent movement in the axial direction during cold forming operations comprises a base member and a removable clamping member, each having a mating surface having a substantially semi-circular channel cut therein, such that when the base and top members are joined the channels align to define a generally circular bore to receive the metal tube. A tube having an outer radius matching or slightly exceeding the channel radii is placed into the semi-circular channel of the base member with its end extending a short distance beyond the forward edge of the base member, and the semi-circular channel of the top member is positioned to encompass the tube. Force is then applied to the base and top member, thereby securely clamping the tube between the base and top members. The width of the base and top members in the axial direction must be sufficient to provide enough frictional resistance to secure the tube against the axial pressures encountered in the cold forming operation.

To improve the gripping ability of such clamps, it is known to provide the semi-circular channels with annular grooves in the plane perpendicular to the central axis by removing material to form V-shaped, U-shaped or rectilinearly walled grooves at spaced intervals along the main axis. When the top and base members are clamped together, the grooves allow the clamping device to grip the tube more securely than if the walls were smooth.

It is an object of this invention to provide for an improved clamping device for thin-walled metal tubes which precludes movement in the axial direction when cold forming pressure is applied against the tube end by providing annular grooves which are cold formed into the walls of the semi-circular channels rather being formed by a cutting or material-removing operation, such that each groove comprises a pair of raised shoulders which extend slightly out of the channel wall. The raised shoulders more securely grip the outer wall of the tube to create greater resistance to movement in the axial direction, allowing for a reduction in dimension for the clamp in the axial direction and allowing for application in the radial direction of a smaller clamping force against the tube itself. It is a further to provide such a clamping device wherein a simple cam mechanism is used to provide the clamping pressure so that the clamping operation can be performed easily and quickly without the need for securing and releasing threaded bolts. These and other objects not expressed in this section will be achieved by and apparent from the disclosure which follows.

SUMMARY OF THE INVENTION

The invention comprises in general a clamping device for securing thin-walled metal tubes to preclude axial movement when the end of the tube is being cold formed to alter its shape, and is particularly designed to restrain the tube against force directed against the tube end in the axial direction. The clamping device has two major components, a base member and a clamping member, each having a mating surface with at least one tube receiving channel, and preferably multiple tube receiving channels of different sizes positioned laterally so that one clamping device is operative for a plural number of particular tube outer diameters, whereby the tube to be secured is encircled by a bore defined by the paired tube receiving channels of the base and clamping members when the mating surfaces are properly positioned facing each other. Force application means to compress the base and clamping members together is provided to securely grip the tube within the bore. The forward portion of each of the tube receiving channels at the front wall may be provided with forming portions of various configurations so as to impart a desired configuration to the tube end when a cold forming die is coaxially advanced against the tube end by hydraulic or other powered means. The rear wall of the base and clamping members is abutted against a backstop member of the cold forming equipment, or the clamping device may be secured to a fixed component of the cold forming equipment, to preclude movement of the device during the cold forming operation.

The tube receiving channels, which are generally semi-circular in shape, are provided with a plural number of axially-spaced, annular grooves to better grip the outer walls of the tube. The grooves are preferably created by cold forming techniques, as opposed to machining or cutting techniques, such that each groove comprises a recess extending into the channel wall and a pair of raised edges or shoulders extending a relatively short distance out from the channel wall, the shoulders being formed from material shifted from the area of the recess. The raised shoulders bite into the outer wall of the metal tube when the base and clamping members are pressed together, thereby securing the tube against axial movement.

In a simple embodiment, the force application means may comprise threaded bolts which extend through the base and clamping members, such that the base and clamping members are pressed together by turning the bolts. In a preferred embodiment, the force application means comprises a cam mechanism having a bracket which encircles the base and clamping members. A handled lever is pivotally mounted to the bracket in a manner whereby pivoting the lever moves a roller member from a recessed position to an abutting position against the clamping member, thereby pressing the clamping member against the base member and securing the tube within the tube receiving bore.

BRIEF DESCRIPTION OF THE DRAWINGS

FIG. 1 perspective view showing the base and top members encasing a thin-walled metal tube.

FIG. 2 is a of the mating surface of the base member.

FIG. 3 is a view of the mating surface of the clamping member.

FIG. 6 is a front view of the clamping apparatus, shown with the upper portion of the front wall of the bracket removed showing the cam mechanism for applying force to the base and clamping members.

FIG. 7 of the clamping apparatus with the cam mechanism.

DETAILED DESCRIPTION OF THE INVENTION

Figure 4:
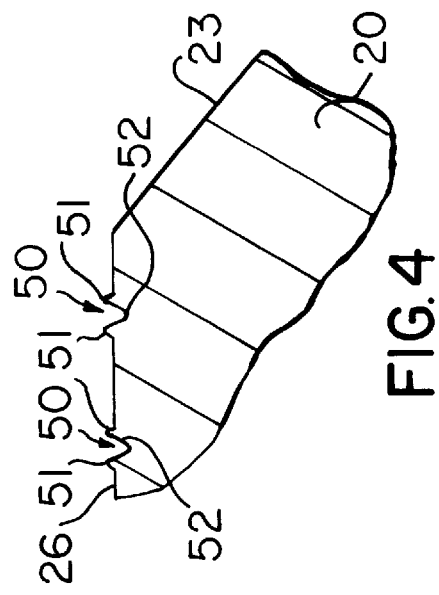
FIG. 4 is a partial cross-sectional view showing the configuration of the grooves in the tube receiving channel.

With reference to the drawings, the invention will now be described in detail with regard for the best mode and the preferred embodiment. In general, the invention is a clamping device for use with thin-walled metal tubing, the device temporarily gripping the tube with minimal deformation or damage to the tube to secure the tube in a fixed manner during cold forming operations on the tube, and in particular precluding movement in the axial direction when a cold forming die is coaxially applied against the tube end with sufficient force to alter the shape of the tube end. A typical cold forming apparatus may comprise a die mounted onto a reciprocating shaft, where the die is advanced against the tube end by hydraulic or other power means in order to flare, bead, enlarge or reduce the tube end.

With reference to FIGS. 1 through 4, the major structure and components of the clamping device 10 are shown. The clamping device 10 comprises in general a base member 20 and a clamping member 30 which can be brought together to grip a tube 90. As shown, the base member 20 is depicted as a bottom member and the clamping member 30 as a top member, but the particular orientation of the two members 20 and 30 is a matter of choice. The base member 20 and the clamping member 30 are preferably bar shaped, having an elongated rectangular configuration which defines a front wall 25 and rear wall 27 for the base member 20 and a front wall 35 and rear wall 37 for the clamping member 30. For purposes of discussion herein, the front or forward direction shall be taken to mean the direction toward the cold forming die, i.e., in the direction of the free tube end 91 being worked, and the rear or backward direction shall be taken to be the opposite. Any reference to the axial direction shall be the direction parallel or along the central axis of the tube 90 held in the clamping device 10, i.e., the direction generally perpendicular to the front walls 25 and 35 or the rear walls 27 and 37. The base member 20 is provided with a generally planar mating surface 21 and the clamping member 30 is provided with a generally planar mating surface 31, such that the mating surfaces 21 and 31 face each other when a tube 90 is clamped between the base and clamping members 20 and 30. Preferably the base and clamping members 20 and 30 are composed of a hard metal.

To achieve proper alignment, alignment means are provided which as shown may comprise a pair of alignment pins 42 extending upward from the mating surface 21 of the base member 20, the pins 42 extending into alignment bores 41 positioned in the mating surface 31 of the clamping member 30. Alternatively, the pins 42 could be placed on the clamping member 30 and the bores 41 placed on the base member 20, or other commonly known suitable means to insure proper alignment of the two members 20 and 30 could be utilized. The base and clamping members 20 and 30 must be separable to some degree to allow for insertion of the tube 90 between the two mating surfaces 21 and 31.

Figure 8:
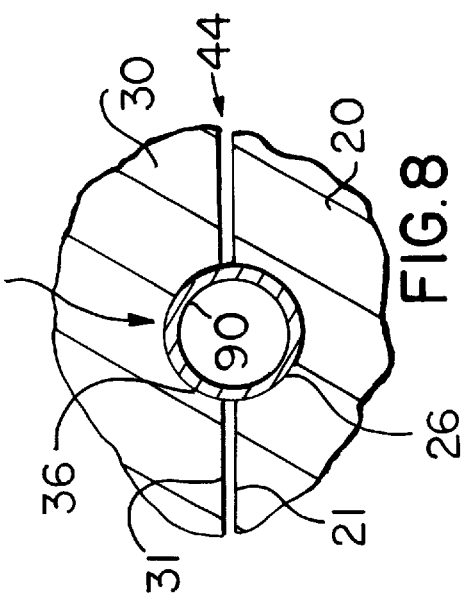
FIG. 8 is a sectional view showing a tube 90 clamped between the base and clamping members.

At least one and most preferably multiple tube receiving channels 22 are spaced laterally along the mating surface 21 of base member 20. Where multiple channels 22 are present, each is configured to receive a tube 90 of differing outer diameter. The channels 22 are generally semi-circular in lateral cross-section and extend axially from the front wall 25 to the rear wall 27 such that a channel wall 26 is defined which matingly corresponds to a portion of the outer wall of tube 90. In order that a clamping force can be applied to secure the tube 90, the maximum depth of the channel wall 26 of a particular tube receiving channel 22 from the mating surface 21 is preferably slightly less than the radius of the substantially semi-circular cross-section of that channel 22. Preferably, the central axis of the channel wall 26 will reside at a point approximately ten to fifteen thousandths of an inch above the plane containing the mating surface 21. Thus the lateral cross-section of the channel wall 26 will comprise a major portion of a semi-circle, but not a full 180 degrees.

in corresponding manner, the mating surface 31 of the clamping member 30 is provided with at least one and preferably multiple tube receiving channels 32, each located at the correct position to correlate with the tube receiving channels 22 in the base member 20, so that when the mating surfaces 21 and 31 are brought together, the combination of adjacent channels 22 and 32 will define a generally circular tube receiving bore 43. As in the base member 20, the channels 32 are substantially semi-circular in lateral cross-section, comprising less than 180 degrees, and extend axially between the front wall 35 and rear wall 37. The radius of the channel wall 36 is greater than its maximum depth from the mating surface 31, again preferably by about ten to fifteen thousandths of an inch. This is illustrated in FIG. 8, which shows that this construction results in the creation of a gap 44 of about twenty to thirty thousandths of an inch between the mating surfaces 21 and 31 when a tube 90 is positioned in the bore 43 defined by channel walls 26 and 36. This gap 44 allows the base and clamping members 20 and 30 to be pressed together by force application means 40 to secure the tube 90.

Alternatively, the corresponding tube receiving channels 22 and 32 may be constructed as full semi-circles in lateral cross-section with their radii sized slightly smaller than the outer radius of the tube 90 to be secured, preferably at a reduction of approximately one percent. Thus when clamping members 20 and 30 are forced together, the tube 90 will be securely gripped because of the small discrepancy between the radii of tube receiving channels 22 and 32 and the outer radius of tube 90.

The tube receiving channels 22 and 32 and the front walls 25 and 35 may be provided with forming portions 23 and 33 which in combination with the forming die define the intended configuration for the tube end 91, such as a flare, annular bead or the like. As shown in the figures, the channels 22 and 32 are configured with forming portions 23 and 33 to produce a flared tube end 91 after the forming die is advanced against the tube end 91.

Figure 5:
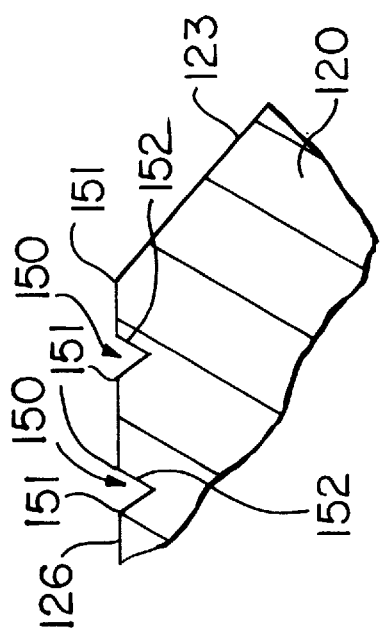
FIG. 5 is a vie similar to FIG. 4 of a prior art device.

In order to improve the frictional gripping ability of the channels 22 and 32, a plural number of annular grooves 50 are positioned at intervals along the channel walls 26 and 36 perpendicular to the central axis, as seen in FIG. 4. Each groove 50 comprises a recessed portion 52 bounded by a pair of raised shoulders 51, where the shoulders 51 extend slightly beyond the channel walls 26 or 36 into the interior of the tube receiving channels 22 and 32, preferably about 2 to 3/1000 inches. The grooves 50 are preferably formed by cold working by pressing an annularly ridged die into the channel walls 26 and 36, the ridges on the die being generally triangular in cross-section, such that material is displaced from the recessed portion 52 to form the shoulders 51. This is in contrast to known prior art, as shown in FIG. 5, where grooves 150 are cut or machined into the mating surface 126 of a base member 120, the grooves 150 having a recess 152 and edges 151, the edges 151 being flush with the mating surface 126 since the grooves 150 are formed by removing material from the base member 120. The shoulders 51 of the grooves 50 act as teeth and bite into the outer wall of the tube 90 when the base and clamping members 20 and 30 are pressed together. This configuration provides a much more secure frictional grip on the tube 90 to prevent its movement in the axial direction with less required clamping force when compared to the grooves 150 known in the prior art. It also allows the base and clamping members 20 and 30 to be shorter in the axial direction without sacrificing gripping strength.

To secure the tube 90 between the base and clamping members 20 and 30 with sufficient force to prevent axial movement during the cold forming process on the tube end 91, force application means 40 are provided which press together base and clamping members 20 and 30. In a simple embodiment, the force application means 40 may comprise one or more threaded clamping bolts 45 which are inserted into smooth walled bores 34 extending through the clamping member 30 aligned with threaded bores 24 positioned in the base member 20, such that once a tube 90 is placed into the properly sized channel 22 and the clamping member 30 is aligned with the base member 20, turning the clamping bolts 45 draws the two mating surfaces 21 and 31 together so that the tube 90 is securely gripped between the two tube receiving channels 22 and 32. The shoulders 51 indent slightly into the outer wall of the tube 90 to preclude axial movement of the tube 90 relative to the clamping device 10, without excessive deformation of the tube 90. Other force application means 40, such as for example C-clamps, powered clamping means or the like can also be used.

In a more preferred embodiment, the force application means 40 comprises a cam lock mechanism 70, as shown in FIGS. 6 and 7. The cam lock 70 comprises a generally U-shaped base member 71 with a bottom 72, front wall 73 and rear wall 74, the base member 71 sized to snugly receive the base and clamping members 20 and 30. A forming aperture 75 is positioned in the front and rear walls 73 and 74 to allow insertion and extension of tube 90 through the base member 71. A cam lever 78 is pivotally mounted between the front and rear walls 73 and 74 on pivot pin 77, such that lever 78 can be moved from a passive position generally parallel to the clamping device 10 (horizontal as shown in the drawings) to an active force-applying position generally perpendicular to the clamping device 10 (vertical as shown in the drawings). A stop member 76 prevents the lever 78 from passing beyond the optimum locking position. The free end of the cam lever 78 may be provided with a handle 81 to provide easier leverage. To reduce friction effects, the opposite end of the lever 78 which contacts the clamping member 30 preferably comprises a roller 79. Once the tube end 91 is properly positioned between the base and clamping members 20 and 30, the cam lever 78 is pulled into the active position, such that roller 79 is pressed against clamping member 30, forcing the clamping member 30 toward the base member 20 such that tube 90 is sufficiently gripped to preclude movement in the axial direction when the cold forming operation is commenced.

It is understood that certain equivalents and substitutions for elements set forth above may be obvious to those skilled in the art, and thus the true scope and definition of the invention is to be as set forth in the following claims.

I claim:

1. A tube clamping device comprising a base member having a generally semicircular tube receiving channel having a channel wall, a clamping member having a generally semi-circular tube receiving channel having a channel wall, where said tube receiving channels in combination when said base member and said clamping member are properly positioned define a tube receiving bore for securing a tube positioned therein, and force application means to press together said base member and said clamping member to secure the tube from movement during cold forming operations, said device further comprising a plural number of annular grooves positioned on said channel walls of said base member and said clamping member, where said grooves each comprise a recessed portion positioned within said channel walls and a pair of raised shoulders, said raised shoulders extending beyond the surface of said channel walls into the interior of said tube receiving channels such that said raised shoulders are adapted to bite into the outer surface of the tube being clamped.

2. The device of claim 1, further comprising alignment means to properly position said base member and said clamping member to define said tube receiving bore.

3. The device of claim 2, where said alignment means comprise alignment pins which are received by alignment bores.

4. The device of claim 1, where said tube receiving channels in said base member and said clamping member have a maximum depth which is less than the radius of said tube receiving channel.

5. The device of claim 1, where said device has plural tube receiving bores defined by the combination of plural tube receiving channels in said base member and said clamping member, where each of said tube receiving bores is a different size from the other tube receiving bores.

6. The device of claim 1, where said force application means comprises a cam lock mechanism.

7. The device of claim 6, where said cam lock mechanism comprises a generally U-shaped base member comprising a bottom, front wall and rear wall which receives said base member and said clamping member therebetween, a forming aperture positioned within said front wall and said rear wall, a cam lever pivotally mounted between said front wall and said rear wall, said cam lever pivoting from a passive position to an active clamping position to press together said base member and said clamping member.

8. The device of claim 7, said cam lever further comprising a roller, such that said roller contacts said clamping member when said cam lever is pivoted into said active clamping position.

9. In a tube clamping device comprising a base member having a generally semi-circular tube receiving channel having a channel wall, a clamping member having a generally semi-circular tube receiving channel having a channel wall, where said tube receiving channels in combination when said base member and said clamping member are properly positioned define a tube receiving bore for securing a tube positioned therein, and force application means to press together said base member and said clamping member to secure the tube from movement during cold forming operations, the improvement comprising a plural number of annular grooves positioned on said channel walls of said base member and said clamping member, where said grooves each comprise a recessed portion positioned within said channel walls and a pair of raised shoulders, said raised shoulders extending beyond the surface of said channel walls into the interior of said tube receiving channels such that said raised shoulders are adapted to bite into the outer surface of the tube being clamped.

10. The device of claim 9, where said force application means comprises a cam lock mechanism.

11. The device of claim 10, where said cam lock mechanism comprises a generally U-shaped base member comprising a bottom, front wall and rear wall which receives said base member and said clamping member therebetween, a forming aperture positioned within said front wall and said rear wall, a cam lever pivotally mounted between said front wall and said rear wall, said cam lever pivoting from a passive position to an active clamping position to press together said base member and said clamping member.

12. The device of claim 11, said cam lever further comprising a roller, such that said roller contacts said clamping member when said cam lever is pivoted into said active clamping position.

13. A tube clamping device comprising a base member having a generally semi-circular tube receiving channel having a channel wall, a clamping member having a generally semi-circular tube receiving channel having a channel wall, where said tube receiving channels in combination when said base member and said clamping member are properly positioned define a tube receiving bore for securing a tube positioned therein, and force application means to press together said base member and said clamping member to secure the tube from movement during cold forming operations, where said force application means comprises a cam lock mechanism comprising a generally U-shaped base member comprising a bottom, front wall and rear wall which receives said base member and said clamping member therebetween, a forming aperture positioned within said front wall and said rear wall, a cam lever pivotally mounted between said front wall and said rear wall, said cam lever pivoting from a passive position to an active clamping position to press together said base member and said clamping member.

14. The device of claim 13, said cam lever further comprising a roller, such that said roller contacts said clamping member when said cam lever is pivoted into said active clamping position.

\* \* \* \* \*